United States Patent Office 3,028,402
Patented Apr. 3, 1962

3,028,402
HIGH MOLECULAR NITROGEN CONDENSATION PRODUCTS
Otto Albrecht, Neuewelt, near Basel, Switzerland, assignor to Ciba Limited, Basel, Switzerland, a Swiss firm
No Drawing. Continuation of application Ser. No. 396,739, Dec. 7, 1953. This application Mar. 31, 1958, Ser. No. 724,803
Claims priority, application Switzerland Dec. 12, 1952
8 Claims. (Cl. 260—404.5)

The present invention provides new and valuable condensation products containing nitrogen which correspond to the general formula (1)

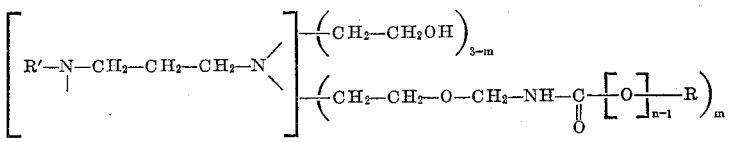

wherein R and R' each represent a straight chain aliphatic high molecular hydrocarbon radical having from 8 to 18 carbon atoms, and $m$ and $n$ each stand for an integer of at the most 2, and salts including quaternary ammonium salts of said condensation products.

The invention also includes a process for the manufacture of the aforesaid new compounds, wherein one mol of an N-alkyl-N,N',N'-trihydroxyethyl-trimethylene diamine of the general formula (2)

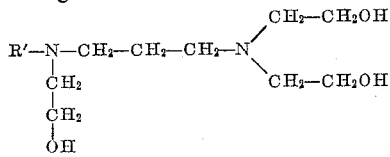

wherein R' represents a straight chain aliphatic high molecular hydrocarbon radical having from 8 to 18 carbon atoms, is condensed with from one to two mols of an aliphatic N-methylol compound of the general formula (3)

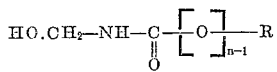

wherein R is a straight chain aliphatic high molecular hydrocarbon radical having from 8 to 18 carbon atoms, and $n$ stands for an integer of at the most 2, and, if desired, the condensation product of the Formula 1 is converted into a salt with an acid or treated with a quaternating agent.

The N-alkyl-N,N',N'-trihydroxyethyl-trimethylene-diamines of the Formula 2 used as starting materials can be prepared by reacting one mol of an N-alkyl-trimethylene-diamine of the formula (4)      R'—NH—CH$_2$—CH$_2$—CH$_2$—NH$_2$ wherein R' has the meaning given above, with three mols of ethylene oxide. The N-alkyl-trimethylene-diamines of the Formula 4 are easily accessible by the additive combination of acrylonitrile with a primary monoamine containing a straight chain aliphatic high molecular hydrocarbon radical having from 8 to 18 carbon atoms, followed by reduction of the nitrile group to the —CH$_2$—NH$_2$ group. For the preparation of such N-alkyl-trimethylene diamines there may be used, for example, dodecylamine, octadecylamine, oleylamine, and also mixtures of amines which correspond to the fatty acids of coconut oil, soya bean oil or tall oil.

As second components for preparing the condensation products of this invention there are used the N-methylol-amides of aliphatic monocarboxylic acids having a straight chain high molecular hydrocarbon radical with 8 to 18 carbon atoms, such as the N-methylolamides of caprylic acid, lauric acid, palmitic acid, stearic acid, oleic acid, linoleic acid and also of hardened train oil fatty acid, or the corresponding N-methylol-urethanes. Especially valuable compounds as starting materials are, for example, the stearic acid N-methylolamide and the N-methylol-octadecyl-urethane.

The reaction between the N-alkyl-N,N',N'-trihydroxyethyl-trimethylene diamines of the Formula 2 and the N-methylol-amides or N-methylol-urethanes of the Formula 3 may be carried out with the aid of heat at a high temperature for example, of 90 to 180° C. and in the presence of a condensing agent. As condensing agents there may be used, for example, boric acid, or agents of alkaline reaction such as sodium carbonate, sodium acetate or alkali salts of boric acids. It may be of advantage to conduct the reaction in an inert gas, for examplt, by introducing nitrogen, or under reduced pressure. Furthermore, it may be of advantage to use a solvent.

When it is desired to convert the product of the condensation into a salt there may be used any of the usual inorganic or organic acids. There may be mentioned, for example, hydrochloric acid, sulphuric acid, formic acid, acetic acid or lactic acid. As quaternating agents, which may be used when it is desired to convert the product into quaternary ammonium salts, there may be used any compound which is capable of converting a tertiary amino group into a quaternary ammonium group. There may be mentioned alkylating and aralkylating agents, such as dimethyl sulfate, ethyl bromide, benzyl chloride or parachlorobenzyl chloride. Furthermore, there may be used alkylene oxides, such as ethylene oxide as quaternating agents, provided that salts of tertiary amines are used as starting materials.

The reaction between the tertiary amines and the alkylating or aralkylating agents is carried out by heating the components, for example, at 90 to 120° C., until the reaction product is soluble in hot water. If desired an organic solvent may be used.

The salts of the new condensation products with hydrohalic acids or aliphatic carboxylic acids of low molecular weight are soluble or easily dispersible in water. They are also cation-active and exhibit a strong affinity for cellulose fibers. They can be used as textile assistants, for example, as wetting, foaming, dispersing or levelling agents, but they are especially effective as softening agents. Especially suitable as softening agents are the compounds which contain two aliphatic radicals containing 16 to 18 carbon atoms, for example, the amide radical of stearic acid amide and the residue of a corresponding alkylamine, for example, octadecylamine. In general the products of the invention possess good heat resistance and do not yellow the treated textile fibers or do so only very slightly. When they are applied to dyed materials, the fastness to light of the dyeings is generally not or not strongly impaired. The new compounds are also very well suited for use in baths used to impart an anti-creasing finish, and in this manner the material treated can be given an anti-creasing finish and also a soft feel.

Valuable compounds are e.g.:

(a) The acetate of the compound of the formula

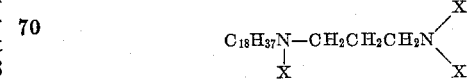

wherein one X stands for the radical —CH₂CH₂OH and the two other X's stand for the radical

—CH₂CH₂OCH₂NHCOOC₁₈H₃₇

(b) The addition product of 1 mol of benzylchloride to 1 mol of the compound of the formula

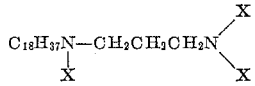

wherein one X stands for the radical —CH₂CH₂OH and the two other X's stand for the radical

—CH₂CH₂OCH₂NH.CO.R (R being the hydrocarbon radical of commercial stearic acid).

(c) The addition product of 1 mol of benzyl chloride to 1 mol of the compound of the formula

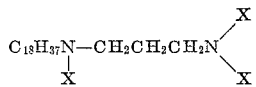

wherein two X's stand for the radical —CH₂CH₂OH and one X stands for the radical

—CH₂CH₂OCH₂NH.CO.OC₁₈H₃₇

This application is a continuation of application Serial No. 396,739, filed December 7, 1953 (now abandoned).

The following examples illustrate the invention, the parts being by weight unless otherwise stated and the relationship of parts by weight to parts by volume being the same as that of the kilogram to the liter:

*Example 1*

32.4 parts of a mixture of N-alkyl-trimethylene-diamines, in which the alkyl residues correspond to the fatty acids present in soya bean oil, and 0.4 part of sodium are heated in a current of nitrogen at 135° C., 13 parts of ethylene oxide are then introduced in the form of a finely distributed stream of gas. There is obtained a semi-solid mass, which when heated with water and cooled yields an opalescent solution. On the addition of a small amount of formic acid a clear solution is obtained.

20 parts of the obtained mixture of oxyethyl-diamines, 13.1 parts of stearic acid N-methylolamide from commercial stearic acid, which contains a small amount of boric acid, and 0.9 part of anhydrous sodium carbonate are heated in a current of nitrogen at 108° C., while stirring. The whole is then stirred for 4 hours at 108 to 111° C., the pressure being maintained for the first hour at about 540 mm., for the second and third hours at about 340 mm. and for the fourth hour at about 140 mm. After cooling the mixture to about 80° C., air is allowed to enter the reaction vessel. The reaction product is obtained in a yield of 32.7 parts, and is taken up in hot water to yield a strongly opalescent solution. When a test portion is first dissolved in warm glacial acetic acid and diluted with warm water, there is obtained a solution which is only slightly opalescent.

Salts of the resulting condensation product with acids, for example, with formic acid or acetic acid, can be used as softening agents for textile fibers, for example, viscose artificial silk.

The new condensation product can be converted into a quaternary ammonium salt by heating 10 parts of the condensation product with 1.9 parts of benzyl chloride in a current of nitrogen for 6 hours in a boiling water bath. The new quaternary ammonium salt can be taken up in hot water to form an opalescent solution, and can be used for softening.

*Example 2*

32.6 parts of N-octadecyl-trimethylene diamine and 0.4 part of sodium are heated in a current of nitrogen at 135° C., and then 13 parts of ethylene oxide are introduced in a finely distributed stream at 135 to 140° C. There is obtained a soft mass, which on being heated with water and cooled yields an opalescent solution, of which the viscosity is substantially higher than that of water. On the addition of a small amount of formic acid the solution becomes completely clear.

20 parts of the oxyalkylamine so obtained, 13.05 parts of stearic acid N-methylolamide obtained from commercial stearic acid, which contains a small amount of boric acid, and 0.9 part of anhydrous sodium carbonate are heated in the manner described in the second paragraph of Example 1 for 4 hours at 108–111° C. The new condensation product precipitates in a yield of 32.7 parts. It is a hard wax-like mass which, after being dissolved in warm glacial acetic acid, yields a clear foaming solution upon dilution with hot water.

10 parts of this condensation product are heated with 1.9 parts of benzyl chloride in a current of nitrogen for 6 hours in a boiling water bath. The new quaternary ammonium salt so obtained is a solid mass which can be taken up in hot water to yield an opalescent solution. It can be used as a softening agent.

*Example 3*

20 parts of the oxyethylated diamine described in the first paragraph of Example 1 are heated with 26.2 parts of stearic acid N-methylolamide from commercial stearic acid, which contains a small amount of boric acid, and 1.8 parts of anhydrous sodium carbonate, in the manner described in the second paragraph of Example 1. A condensation product is obtained in a yield of 36.8 parts, and after being taken up in glacial acetic acid yields an opalescent solution on dilution with hot water.

10.2 parts of the condensation product so obtained are heated with 1.4 parts of benzyl chloride in a current of nitrogen for 6 hours in a boiling water bath. There is obtained a quaternary ammonium chloride, which can be taken up in water to yield an opalescent solution. It can be used as a softening agent.

*Example 4*

20 parts of the oxyethylated diamine described in the first paragraph of Example 2, are heated with 26.1 parts of stearic acid N-methylolamide from commercial stearic acid, which contains a small amount of boric acid, and 1.8 parts of anhydrous sodium carbonate, in the manner described in the second paragraph of Example 1. The condensation product obtained in a yield of 45.5 parts, produces an opalescent solution after being taken up in glacial acetic acid and diluted with hot water.

In order to prepare the acetate of the above product 5 parts of the latter are melted together with 0.6 part of glacial acetic acid on a water bath.

There is obtained a solid mass which yields an opalescent solution when dissolved in hot water.

10.2 parts of the condensation product obtained according to the first paragraph of this example and 1.4 parts of benzyl chloride are heated in a current of nitrogen for 6 hours in a boiling water bath. There is obtained a quaternary ammonium salt, which dissolves in hot water to yield an opalescent solution.

*Example 5*

15.2 parts of the oxyethylated N-octadecyl-trimethylene diamine described in the first paragraph of Example 2, 11.3 parts of the N-methylolamide of octadecyl-urethane from commercial octadecyl alcohol and 0.3 part of anhydrous sodium carbonate are heated in the manner described in the second paragraph of Example 2 for 4 hours at 108 to 111° C. The new condensation product, which is obtained in a yield of 26.4 parts, is a colorless hard mass, which, after being taken up in warm glacial acetic acid, yields an opalescent solution upon the addition of hot water.

15.6 parts of the reaction product described above are stirred with 2.8 parts of benzyl chloride for 6 hours in a current of nitrogen in a boiling water bath. When prepared in this manner the new quaternary ammonium salt is a soft mass which yields an opalescent solution when taken up in hot water. The product can be used as a softening agent for textile fibers.

*Example 6*

10.2 parts of the oxyethylated N-octadecyl-trimethylene diamine described in the first paragraph of Example 2, 15 parts of the N-methylolamide of octadecyl urethane from commercial octadecyl alcohol, and 0.45 part of anhydrous sodium carbonate are heated as described in the second paragraph of Example 2 for 4 hours at 108 to 111° C. A condensation product obtained in a yield of 24.7 parts is a colorless wax-like mass which, when dissolved in warm glacial acetic acid, yields an opalescent solution with hot water.

For preparing the acetate 5.5 parts of the condensation product described in the preceding paragraph are melted wtih 0.6 part of glacial acetic acid on the water bath. There is obtained a pale hard mass which is soluble in hot water to yield an opaliscent solution and can be used for softening textile fibers.

*Example 7*

For softening artificial silk yarn the procedure is as follows: Viscose artificial silk yarn is worked at a liquor ratio of 1:30 for ½ hour at 30° C. in an aqueous bath, which contains, per liter, 0.05 gram of the salt described in the second paragraph of Example 4. The yarn is then centrifuged and dried. The artificial silk so treated has an extraordinarily soft slippery feel.

In a similar manner wool yarn may be softened.

*Example 8*

100 parts of a fabric of staple fibers of regenerated cellulose, which has been dyed with 1.7 percent of the blue-dyeing copper compound of the azo dyestuff from 1 mol of tetrazotized dianisidine and 2 mols of 2-hydroxynaphthalene-3:6-disulfonic acid (the copper compound being obtained by coppering accompanied by demethylation, are treated on the foulard with a bath which contains, per liter, 160 grams of dimethylolurea, 5 grams of ammonium chloride, 6 cc. of concentrated aqueous ammonia solution and 2 grams of the salt described in the second paragraph of Example 4. After being squeezed, the fabric is dried, heated for 10 minutes at 130 to 140° C., and then washed at 30 to 40° C. for 10 minutes at a liquor ratio of 1:30 with an aqueous solution which contains, per liter, 2 grams of sodium carbonate and 0.5 gram of a synthetic washing agent. In this manner there is obtained a material having a crease-resistant dressing and a very soft feel. The fastness to washing of the dyeing is not impaired by the addition of the softening agent.

*Example 9*

To 25 parts of the condensation product described in the first paragraph of Example 1 there are added 13.4 parts of stearic acid methylol amide and 50 parts of toluene and the whole is heated for 4 hours to the boil under reflux, so that the condensate flowing out of the cooler is passed through a water-separator before being returned to the reaction vessel.

0.5 part of boric acid is added and the whole is heated for a further 3 hours on the water-separator. At the end of this time 0.9 part of water has been split off altogether. After distilling off, the new condensation product forms a solid mass. To convert the product into the acetate, 1 mol of the resulting condensation product is heated to melting point with about 2 mols of glacial acetic acid while stirring. The new water-soluble acetate can be used for softening fibers.

What is claimed is:

1. A condensation product which in its free base state corresponds to the formula

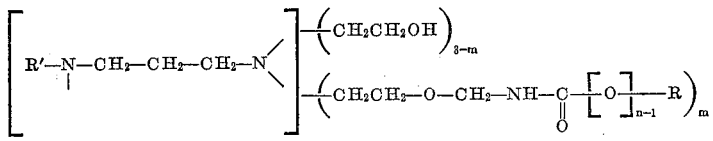

wherein R and R' each represent a straight chain aliphatic high molecular hydrocarbon radical having from 8 to 18 carbon atoms, and $m$ and $n$ each stand for an integer of at the most 2.

2. An acid addition salt selected from the group consisting of an acetate and formate of a base which corresponds to the formula

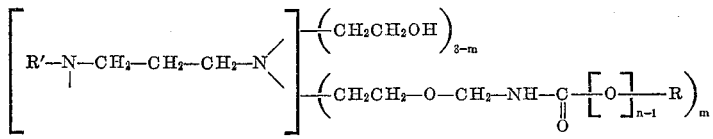

wherein R and R' each represent a straight chain aliphatic high molecular hydrocarbon radical having from 8 to 18 carbon atoms, and $m$ and $n$ each stand for an integer of at the most 2.

3. A quaternary ammonium salt which is the addition product of benzyl chloride to a base which corresponds to the formula

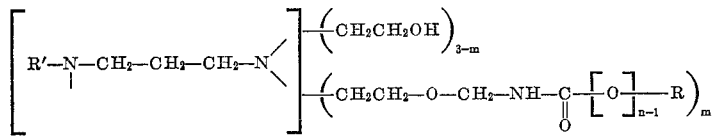

wherein R and R' each represent a straight chain aliphatic high molecular hydrocarbon radical having from 8 to 18 carbon atoms, and $m$ and $n$ each stand for an integer of at the most 2.

4. The acetate of the base of the formula

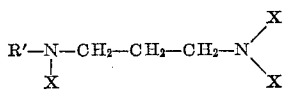

wherein one X stands for the radical —CH$_2$—CH$_2$—OH and the other two X's stand for the radical

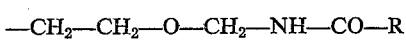

R being the hydrocarbon radical of commercial stearic acid, and R' stands for the alkyl residues of the fatty acids present in soya bean oil.

5. The addition product of 1 mol of benzyl chloride to 1 mol of the base of the formula

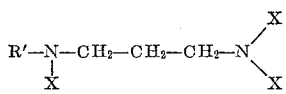

wherein one X stands for the radical —CH₂—CH₂—OH and the other two X's stand for the radical

—CH₂—CH₂—O—CH₂—NH—CO—R

R being the hydrocarbon radical of commercial stearic acid, and R' stands for the alkyl residues of the fatty acids present in soya bean oil.

6. The acetate of the compound of the formula

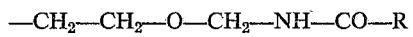

wherein one X stands for the radical —CH₂CH₂OH, and the two other X's stand for the radical

—CH₂CH₂OCH₂NHCOOC₁₈H₃₇

7. The addition product of 1 mol of benzylchloride to 1 mol of the compound of the formula

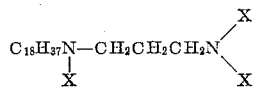

wherein one X stands for the radical —CH₂CH₂OH, and the two other X's stand for the radical

—CH₂CH₂OCH₂NH.CO.R (R being the hydrocarbon radical of commercial stearic acid).

8. The addition product of 1 mol of benzyl chloride to 1 mol of the compound of the formula

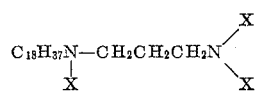

wherein two X's stand for the radical —CH₂CH₂OH, and one X stands for the radical

—CH₂CH₂OCH₂NH.CO.OC₁₈H₃₇

References Cited in the file of this patent

UNITED STATES PATENTS

| | | |
|---|---|---|
| 2,103,872 | Schoeller et al. | Dec. 28, 1937 |
| 2,210,442 | Balle et al. | Aug. 6, 1940 |
| 2,290,411 | De Groote et al. | July 21, 1942 |
| 2,333,770 | Dickey et al. | Nov. 9, 1943 |
| 2,361,185 | Engelmann | Oct. 24, 1944 |
| 2,417,513 | Nelles et al. | Mar. 18, 1947 |
| 2,474,202 | Rust | June 21, 1949 |
| 2,523,934 | Albrecht | Sept. 26, 1950 |
| 2,569,417 | Jayne et al. | Sept. 25, 1951 |
| 2,589,674 | Cook et al. | Mar. 18, 1952 |
| 2,644,003 | Gysin et al. | June 30, 1953 |
| 2,668,165 | Carpenter | Feb. 2, 1954 |